(12) United States Patent
Devnath

(10) Patent No.: US 6,762,625 B1
(45) Date of Patent: Jul. 13, 2004

(54) PROGRAMMABLE DIFFERENTIAL CURRENT MODE LINE DRIVER WITH MULTIPLE CLASSES OF CIRCUIT OPERATION

(75) Inventor: Varadarajan Devnath, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/304,108

(22) Filed: Nov. 25, 2002

(51) Int. Cl.[7] ............................................. H03K 19/20
(52) U.S. Cl. ........................ 326/115; 326/83; 327/108
(58) Field of Search ........................ 326/82, 83, 86, 326/87, 112, 115, 119, 122; 327/108, 109

(56) References Cited

U.S. PATENT DOCUMENTS 6,437,599 B1 * 8/2002 Groen ........................ 326/63
6,504,397 B1 * 1/2003 Hart et al. .................. 326/30
6,700,403 B1 * 3/2004 Dillon ........................ 326/37

* cited by examiner

*Primary Examiner*—James H. Cho
(74) *Attorney, Agent, or Firm*—Vedder, Price, Kaufman & Kammholz, P.C.

(57) ABSTRACT

A programmable differential current mode line driver with multiple classes of circuit operation that can be digitally programmed to operate in a low distortion, low noise class A mode or a low power class B mode, with multiple signal levels available in each mode of operation.

21 Claims, 8 Drawing Sheets

| V(n) | Vsw1(n) | Vsw2(n) | Vhold(n) |
|---|---|---|---|
| +8 | 11111111 | 00000000 | 11111111 |
| +7 | 01111111 | 00000000 | 01111111 |
| +6 | 00111111 | 00000000 | 00111111 |
| +5 | 00011111 | 00000000 | 00011111 |
| +4 | 00001111 | 00000000 | 00001111 |
| +3 | 00000111 | 00000000 | 00000111 |
| +2 | 00000011 | 00000000 | 00000011 |
| +1 | 00000001 | 00000000 | 00000001 |
| 0 | 00000000 | 00000000 | 00000000 |
| −1 | 00000000 | 00000001 | 00000001 |
| −2 | 00000000 | 00000011 | 00000011 |
| −3 | 00000000 | 00000111 | 00000111 |
| −4 | 00000000 | 00001111 | 00001111 |
| −5 | 00000000 | 00011111 | 00011111 |
| −6 | 00000000 | 00111111 | 00111111 |
| −7 | 00000000 | 01111111 | 01111111 |
| −8 | 00000000 | 11111111 | 11111111 |

PROGRAMMABLE DIFFERENTIAL CURRENT MODE LINE DRIVER WITH MULTIPLE CLASSES OF CIRCUIT OPERATION

BACKGROUND OF THE INVENTION

1. Field of the Invention

The present invention relates to differential current mode line driver circuits, and in particular, to programmable differential current mode line driver circuits capable of multiple classes of circuit operation.

2. Description of the Related Art

Differential current mode line driver circuits are well known in the art, particularly for use in Ethernet networks such as 100 BASE T and now 1000 BASE T, also known as Gigabit Ethernet (where BASE refers to baseband signaling, and T refers to twisted-pair cabling). Particularly for 1000 BASE T, it is important that multiple drivers be operating in a full duplex mode of operation. Conventional line drivers typically operate in a class A mode in which the current sources are always turned on. This is necessary to avoid ground bounce that often occurs when the current sources are switched on and off at high data rates, and thereby keep distortion low in the output signal waveform. While operation in a class B mode will reduce power consumption, the output data signal will be distorted due to ground bounce introduced by the switching of the current sources.

Accordingly, it would be desirable to have a differential current mode line driver circuit capable of operating in a low distortion, low noise class A mode or a low power class B mode, as desired for the particular application.

SUMMARY OF THE INVENTION

In accordance with the presently claimed invention, a programmable differential current mode line driver is provided with multiple classes of circuit operation that can be digitally programmed to operate in a low distortion, low noise class A mode or a low power class B mode, with multiple signal levels available in each mode of operation.

In accordance with one embodiment of the presently claimed invention, a programmable differential current mode line driver with multiple classes of circuit operation includes programmable differential current mode line driver circuitry and control circuitry. The programmable differential current mode line driver circuitry receives a plurality of mode control signals and in response thereto operates in one of a plurality of circuit operation modes and provides a differential current signal with one of a plurality of signal values. The control circuitry, coupled to the programmable differential current mode line driver circuitry, receives a plurality of digital input signals and in response thereto provides the plurality of mode control signals. In response to a first portion of the plurality of digital input signals, the one of a plurality of circuit operation modes includes one of a plurality including a class A circuit operation mode and a class B circuit operation mode. In response to a second portion of the plurality of digital input signals, the one of a plurality of signal values includes one of a plurality including a plurality of positive signal values and a plurality of negative signal values.

In accordance with a more specific embodiment, the programmable differential current mode line driver circuitry further receives a clock signal with a plurality of clock cycles, and the class B circuit operation mode includes a plurality of circuit operation cycles; a precharge cycle during a first portion of the plurality of clock cycles in which the differential current signal becomes a common mode current signal; a hold cycle during a second portion of the plurality of clock cycles in which the differential current signal becomes a differential current signal with the one of the plurality of signal values; and a discharge cycle during a third portion of the plurality of clock cycles in which the differential current signal becomes approximately zero.

In accordance with another embodiment of the presently claimed invention, a method for generating a programmable differential current signal in accordance with multiple classes of circuit operation includes:

receiving a plurality of mode control signals and in response thereto operating in one of a plurality of circuit operation modes and generating a differential current signal with one of a plurality of signal values; and receiving a plurality of digital input signals and in response thereto generating the plurality of mode control signals, wherein in response to a first portion of the plurality of digital input signals, the one of a plurality of circuit operation modes includes one of a plurality including a class A circuit operation mode and a class B circuit operation mode, and in response to a second portion of the plurality of digital input signals, the one of a plurality of signal values includes one of a plurality including a plurality of positive signal values and a plurality of negative signal values.

In accordance with a more specific embodiment, further included is receiving a clock signal with a plurality of clock cycles, and the receiving of a plurality of mode control signals and in response thereto operating in a class B circuit operation mode and generating a differential current signal with one of a plurality of signal values includes:

operating in a precharge cycle during a first portion of the plurality of clock cycles in which the differential current signal becomes a common mode current signal;

operating in a hold cycle during a second portion of the plurality of clock cycles in which the differential current signal becomes a differential current signal with the one of the plurality of signal values; and operating in a discharge cycle during a third portion of the plurality of clock cycles in which the differential current signal becomes approximately zero.

In accordance with another more specific embodiment, the receiving of a plurality of mode control signals and in response thereto operating in a class B circuit operation mode and generating a differential current signal with one of a plurality of signal values includes:

operating in a precharge cycle during which a common mode current signal is generated;

operating in a hold cycle during which the common mode current signal generated in the precharge cycle becomes a differential signal with one of the plurality of signal values; and operating in a discharge cycle in which the differential signal generated in the hold cycle becomes another common mode current signal which becomes approximately zero.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
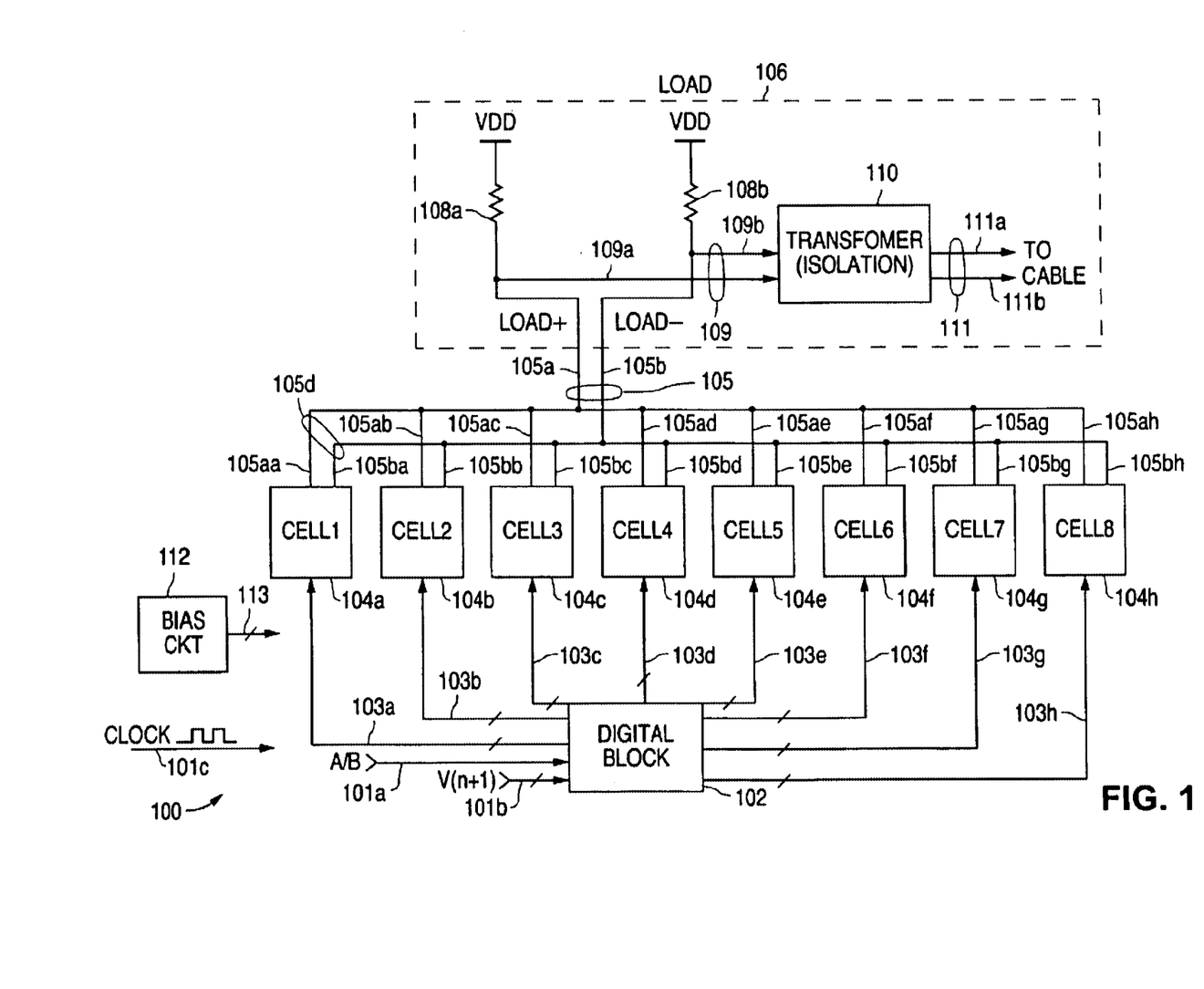
FIG. 1 is a block diagram of a programmable differential current mode line driver circuit in accordance with one embodiment of the present invention.

Referring to FIG. 1, a programmable differential current mode line driver 100 with multiple classes of circuit operation in accordance with one embodiment of the presently claimed invention provides for operation in class A or class B mode and is capable of providing a differential output signal having 17 levels. As discussed in more detail below, the output levels range from +8 through −8, including zero. This is done by using a digital controller 102 that is programmed in accordance with programming signals 101a, 101b for controlling the mode of operation (class A or class B) and magnitude, or level, respectively, of the differential output signal 105. This programmable controller 102, in turn, provides the mode control signals 103a, 103b, . . . , 103h to eight differential current mode line driver circuits 104a, 104b, . . . , 104h, each of which provides its own respective differential output current component 105aa/ 105ba, 105ab/105bb, . . . , 105ah/105bh, all of which sum together to provide the differential output current components 105a, 105b. In accordance with well known differential current mode line driver circuits operation, these differential output current components 105a, 105b generate a differential output voltage having differential output voltage components 109a, 109b across the load resistors 108a, 108b (e.g., 50 ohms each when used in conventional Ethernet applications). This differential output voltage 109 is isolated with an isolation transformer 110 to produce a differential output voltage 111 for driving the data signal cabling, e.g., Category 5 cable (not shown).

A bias circuit 112 provides a number of bias signals 113 for the individual current driver circuits 104a, 104b, . . . , 104h (discussed in more detail below). As should be readily understood, by programming the individual differential current driver circuits 104a, 104b, . . . , 104h to produce a positive or negative differential output current component 105d, the resulting combined, or composite, differential output current 105 can achieve any of the output levels ranging from +8 through −8. Further, independent from the output current level, the class of operation can also be controlled in accordance with an A/B mode control signal 101a as reflected in the decoded mode control signals 103a, 103b, . . . , 103h.

Figure 2:
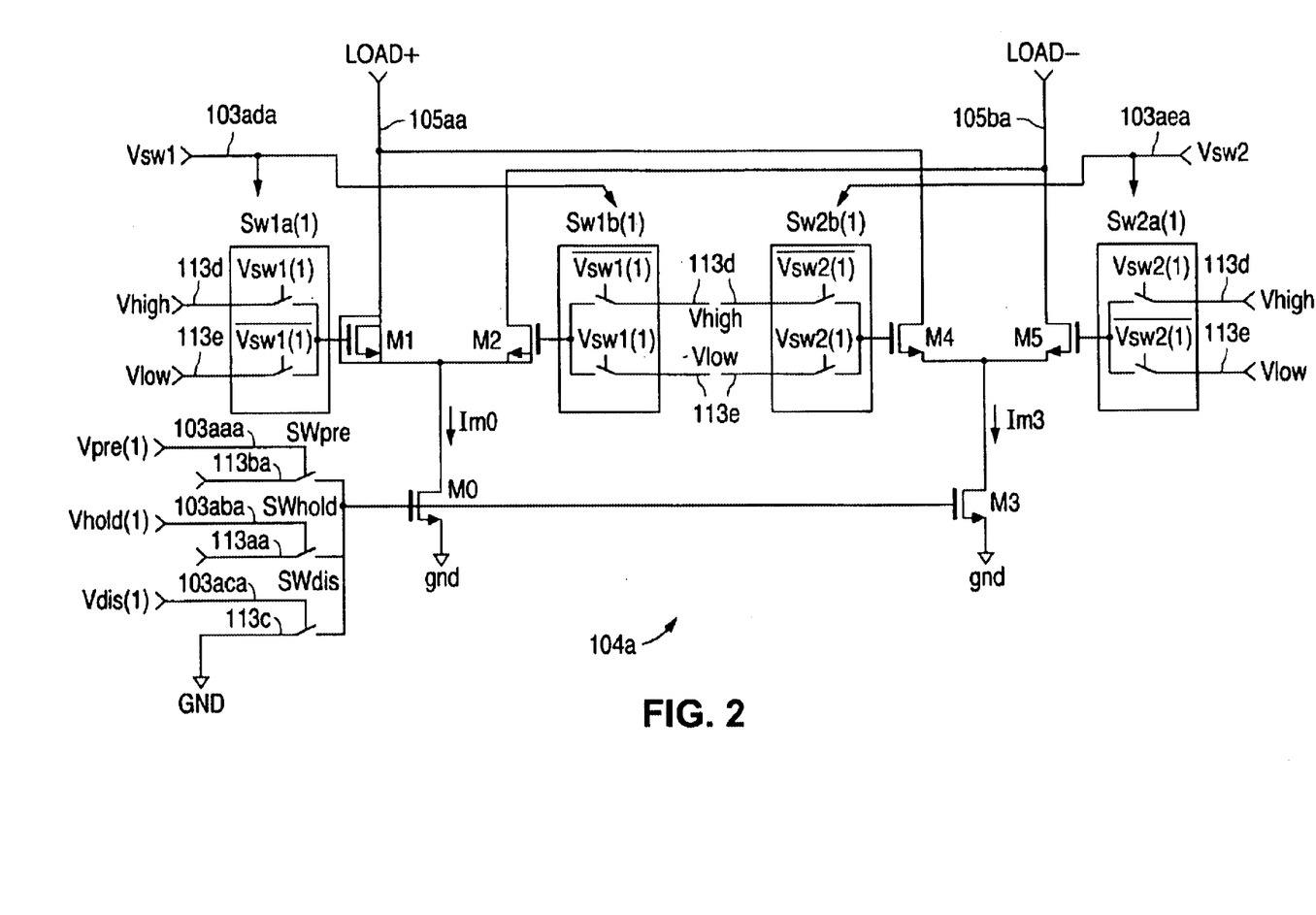
FIG. 2 is a schematic diagram of one embodiment of the individual line driver circuits of FIG. 1.

Referring to FIG. 2, one embodiment of the first differential current mode line driver circuit 104a (it will be readily understood that the remaining driver circuits 104b, 104c, . . . , 104h will be of similar design) is implemented using N-type MOS transistors. (It will be readily understood that a P-type MOS implementation can be used as well, with appropriate reversal of the connections of the transistors M0, M1, M2, M3 and load resistors 108a, 108b to circuit ground GND instead of the power supply voltage VDD as shown in FIG. 1. Transistors M0 and M3 are tail current sources that provide currents Im0 and Im3 that will ultimately flow through the load (where Iload=Im0+Im3), with such currents Im0 and Im3 being steered by differential transistor pair M1 and M2 and differential transistor pair M4 and M5, respectively. The gate terminals of transistors M0 and M3 are connected to three switches Swpre, Swhold, Swdis. These switches are preferably implemented as full complementary MOS switches, or transmission gates, so as to minimize charge injection into the gate terminal of transistor M3. Switches Swpre, Swhold, Swdis are used in the precharge, hold and discharge cycles, respectively (discussed in more detail below).

Transistors M1 and M2 steer the current Im0 provided by transistor M0, while transistors M4 and M5 steer the current Im3 provided by transistor M3. They also serve as cascode transistors to increase the output impedances of current source transistors M0 and M3. The gate terminals of transistors M1, M2, M4 and M5 are connected through switches SW1(a,b) and SW2(a,b) to high Vhigh 113d and low Vlow 113e bias voltages (e.g., provided by the bias circuit 112, FIG. 1, and buffered for avoiding introduction of noise) to turn them on and off, respectively. The control signals Vsw1 103ada, Vsw2 103aea for these switches SW1(a,b), SW2 (a,b) are part of the set 103a of mode control signals provided by the controller 102 (FIG. 1). As noted above, the output current components 105aa, 105ba are connected in parallel with those of the remaining driver cells 104b, 104c, . . . , 104h for summing to provide the final differential output current 105.

During class A operation, all of the tail current sources (transistors M0 and M3) are on at all times. This results in this being no change in the current through the ground pin for each driver circuit 104a, 104b, . . . , 104h, thereby producing negligible ground bounce. This also results in producing a differential output current 105 with low distortion. During such operation, each cell 104 is configured to be in a hold mode of operation, where the hold switch Swhold is closed and the pre-charge Swpre and discharge Swdis switches are maintained in their open states. As a result, the gate terminals of transistors M0 and M3 are connected, via switch Swhold, to a quiet bias voltage 113aa. This quiet bias voltage 113aa is shared by all of the current sources (M0, M3) during the hold mode so as to ensure consistent matching among the driver cells 104.

When driving a +1 to the load, control signal Vsw1 is pulled high and control signal Vsw2 is pulled low. This causes load current components Im0 and Im3 to be steered through transistors M1 and M4, respectively, to the load. Similarly, when driving a −1 on the line, control signal Vsw2 is pulled high and control signal Vsw1 is pulled low, thereby causing load current components Im0 and Im3 to be steered through transistors M2 and M5, respectively, to the load. When driving a 0 to the load, both control signals Vsw1 and Vsw2 are pulled high, thereby causing load current components Im0 and Im3 to be steered through transistors M1 and M5, respectively, and be divided evenly between the two output current components 105aa, 105ba.

During class B mode of operation, the current source transistors M0 and M3 are turned on only when needed, and are turned off otherwise. For example, when driving a +5 to the load, the tail current source circuits of the first five cells 104a, 104b, 104c, 104d, 104e are turned on and the tail current source circuits of the last three cells 104f, 104g, 104h are turned off, in other words, the tail current source circuit of the sixth driver cell 104f is turned on only when driving a level of six or higher. Similarly, when driving a −5 to the load, only the current source circuits of the first five driver cells 104a–104e are turned on.

Abrupt turning on and off of current sources can cause significant ground bounce due to high slew rates of the current changes through the bonding wires and packaging inductances on the ground pins (of the circuit when implemented in an integrated circuit environment). In order to reduce such ground bounce, the slew rate of the current through the ground inductance must be controlled by turning the tail current sources on and off in a controlled manner. This can be achieved by having a pre-charge cycle before and discharge cycle after the data bit interval (e.g., as defined by the system clock signal 101c) in which the current source is to be enabled. During the pre-charge cycle, the current source is turned on, and during the discharge cycle, the current source is turned off, in each instance in a controlled manner. So as to maintain the use of a single clock for the entire operation, each of the pre-charge and discharge cycles is made one clock 101c cycle long. This controlled manner of turning the current source on and off also results in driver circuitry producing reduced electromagnetic interference due to the reduced number of high frequency current signal components.

During the pre-charge cycle of operation, the gates of the tail current source transistors M0, M3 are pre-charged by a replica bias voltage 113ba by closing switch Swpre (with switches Swdis and Swhold maintained in open states). The output currents Im0, Im3 of the tail current sources M0, M3 rise with a time constant that depends upon the on resistance of the associated switch Swpre and the capacitances of the gate terminals of the tail current source transistors M0, M3. Preferably the on resistance of switch Swpre is designed so that the voltages Vg0, Vg3 at the gate terminals of transistors M0 and M3 settle to the desired accuracy within one clock cycle. Additionally, this switch on resistance should be chosen such that the slew rate of the currents Im0, Im3 in transistors M0, M3 are less than the maximum desired value.

Biasing of transistors M0 and M3 during the pre-charge cycle using a dedicated replica bias voltage source will help prevent propagation of ripple on the replica bias voltage line 113ba which would have affected current sources in other driver cells 104 that may be active during such pre-charge cycle of operation.

During this pre-charge cycle, current steering switch control signals Vsw1 and Vsw2 are both pulled high, thereby turning on steering transistors M1 and M5, thereby causing any transient current components within the tail currents Im0, Im3 to appear equally in both output currents 105aa, 105ba. This causes the charging current to become a common mode current and thereby not affect the differential voltage 109 across the load.

During the hold cycle of operation, the current source transistors M0, M3 are used to drive a +1, −1 or zero to the load. During this hold cycle, which follows the pre-charge cycle, switch Swhold is closed (switches Swpre and Swdis are maintained in open states), thereby connecting the gate terminal of transistor M3 to the quiet bias voltage line 113aa. When driving a +1 to the load, control signal Vsw1 is pulled high and control signal Vsw2 is pulled low, thereby causing tail currents Im0 and Im3 to be steered through transistors M1 and M4, respectively, to the load. Similarly, when driving a −1 to the load, control signal Vsw2 is pulled high and control signal Vsw1 is pulled low, thereby steering tail currents Im0 and Im3 through transistors M2 and M5, respectively, to the load.

During the discharge cycle of operation, the gate terminals of tail current source transistors M0 and M3 are connected to a discharge voltage (e.g., circuit ground potential GND) 113c to cause the tail currents Im0, Im3 to go to zero by closing switch Swdis (and maintaining switches Swpre and Swhold in open states). The tail currents Im0, Im3 will fall in value in accordance with a time constant that depends upon the on resistance of switch Swdis and the gate capacitances of transistors M0 and M3. Accordingly, the on resistance of Swdis is preferably designed so that the tail currents M0, Im3 settle to the desired accuracy within one clock bit period. This switch on resistance is also designed such that the slew rates of the tail currents Im0, Im3 is less than the maximum desired value.

During the discharge cycle, switch control signals Vsw1 and Vsw2 are both pulled high so that any transient current components in the tail current Im3 appear equally in the differential output current components 105aa, 105ba, thereby causing the discharge current to become a common mode current and not affect the differential voltage 109 across the load.

Figure 3:
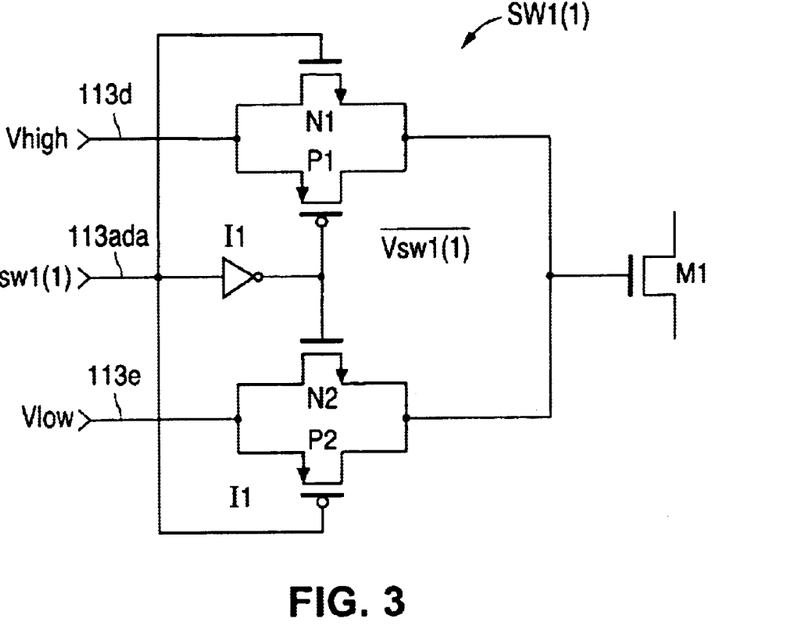
FIG. 3 is a schematic diagram of one example embodiment of the signal switches of FIG. 2.

Referring to FIG. 3, one example embodiment of the control switches SW1(a,b), SW2(a,b) (e.g., the first such switches SW1(a,b), SW2(a,b) for the first driver cell 104a) can be implemented as shown. In accordance with well known techniques, two transmission gates N1/P1, N2/P2 are connected in parallel and driven by the switch control signal Vsw1. When this control signal Vsw1 is high, transistors N1 and P1 are turned on (due to the inversion action of inverter I1), and transistors N2 and P2 are turned off. Accordingly, the high bias voltage Vhigh is applied to the gate terminal of transistor M1. Conversely, when the control signal Vsw1 is low, transistors N1 and P1 are turned off, and transistors N2 and P2 are turned on, thereby causing the low bias voltage Vlow to be applied to the gate terminal of transistor M1.

Figure 4:
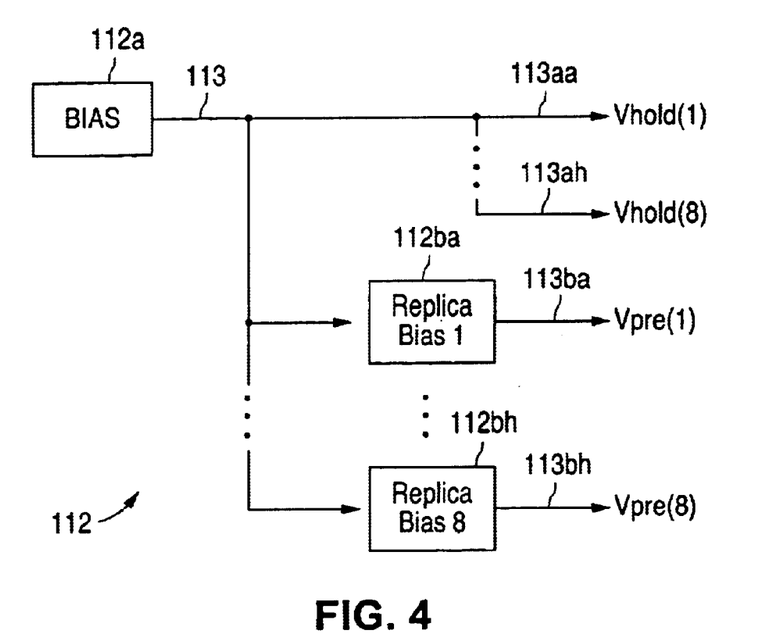
FIG. 4 is a block diagram of the bias circuitry of FIG. 1.

Referring to FIG. 4, the bias circuitry 112 (FIG. 1) includes main bias circuitry 112a which provides the commonly connected quiet bias voltage lines 113aa, 113ab, 113ah to be applied during the hold cycle of operation (as discussed above). The main bias voltage 113 is also replicated by replica bias circuits 112ba, 112bb, . . . , 112bh to provide the individual replica bias voltages 113ba, 113bb, . . . , 113bh for biasing the individual driver cells 104 during the pre-charge cycle of operation (as discussed above).

Figure 5:
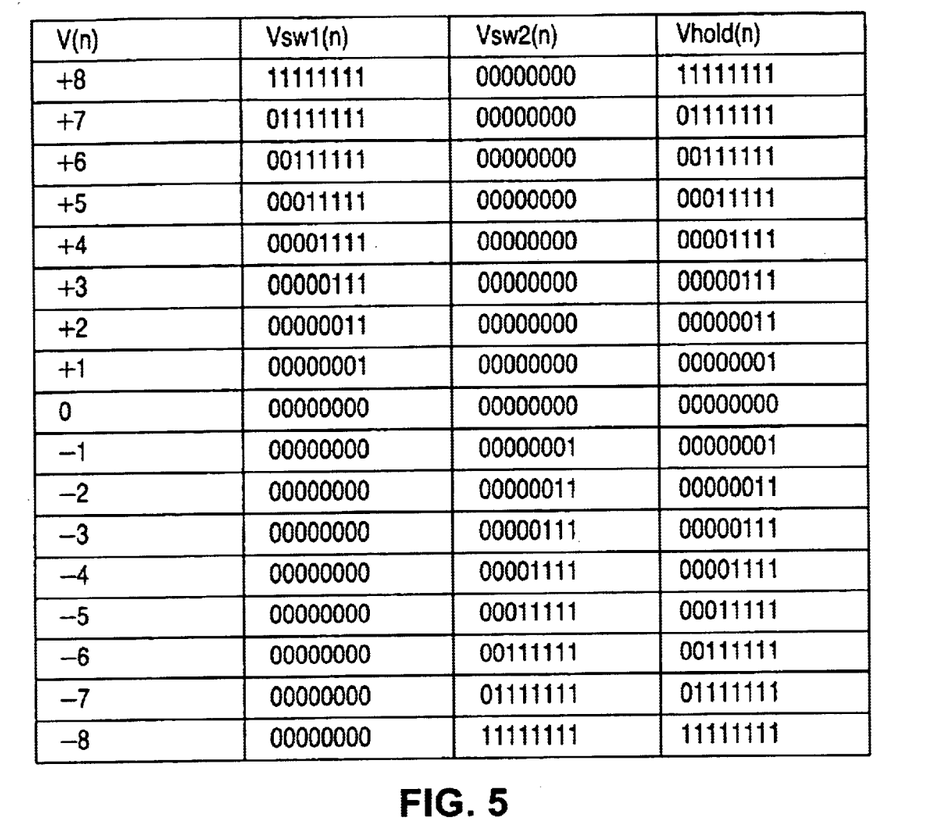
FIG. 5 is a table identifying the signal states of the switching control signals for the current steering and hold operations as a function of the input.

Referring to FIG. 5, the programmable controller 102 (FIG. 1) has an input signal V(n+1) 101b which represents the signal during the next, or following, clock cycle. The programmable controller 102 delays this signal V(n+1) to produce signal V(n) which is the input signal during the present clock cycle. The controller 102 uses these signals to produce the various mode control signals 103 Vsw1(n), Vsw2(n), Vpre(n), Vhold(n), Vdis(n). Each of these control signals is eight bits wide, thereby providing one bit per driver cell 104.

The first current steering switch control signal Vsw1(n) is a "thermometer encoding" of the input signal level when such input signal level is positive. In other words, the number of "1s" in this signal Vsw1(n) equals the value of the input signal level. For example, if input signal V(n) is +5, then signal Vsw1(n) has five "1s". Meanwhile, the second steering current switch control signal Vsw2(n) is zero so long as the input signal level is positive. These signal states of control signals VSW1(n) and Vsw2(n) are reversed when the input signal level is negative.

The hold cycle switch control signal Vhold(n) is a "thermometer encoding" of the absolute value of the input signal level V(n). In other words, the number of "1s" in this signal Vhold(n) equals the absolute value of the input signal level V(n).

The pre-charge control signal Vpre(n) is generated by comparing the present value Vhold(n) of the hold control signal and its next value Vhold(n+1) so as to cause pre-charging of the appropriate driver cells 104 when the next value Vhold(n+1) is greater than the present value Vhold(n). The discharge cycle control signal Vdis(n) is asserted when the driver cells 104 are neither in a pre-charge cycle nor a hold cycle of operation.

During class A operation of the circuit 100 (FIG. 1), current steering switch control signals Vsw1(n) and Vsw2(n) are generated as indicated in the table of FIG. 5. However, the hold cycle control signal Vhold(n) is maintained high, i.e., all "1s", so as to enable the tail currents (Im3) in all of the driver cells 104. Meanwhile, the pre-charge Vpre(n) and discharge Vdis(n) control signals are maintained low, i.e., all "0s", since there are no pre-charge or discharge cycles of operation.

Figure 6A:
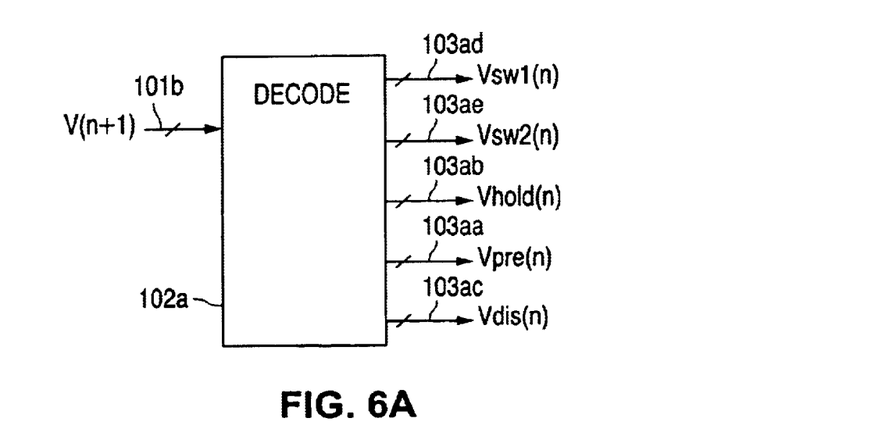
FIGS. 6A, 6B and 6C are block diagrams of various embodiments of the control circuitry of FIG. 1.

Referring to FIG. 6A, one embodiment 102a of the programmable controller 102 is a digital decoding block (e.g., simple combinational logic or programmable logic with appropriate internal delay circuitry as needed) that decodes the incoming signal 101b to produce the appropriate mode control signals 103aa, 103ab, 103ac, 103ad, 103ae (as discussed above).

Figure 6B:
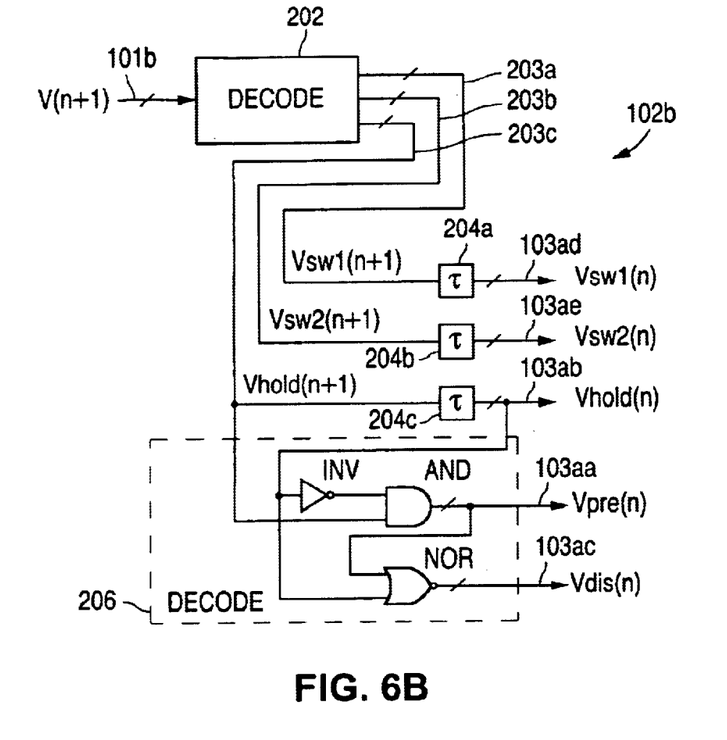

Referring to FIG. 6B, an alternative embodiment 102b includes two decoder stages 202, 206 and a set of signal delay elements 204a, 204b, 204c (e.g., digital registers controlled by the clock signal 10c), all interconnected substantially as shown. The input signal 101b is decoded by the first decoder stage 202 to produce interim control signals in the form of "next value" current steering switch control signals Vsw1(n+1), Vsw2(n+1) and hold cycle control signal Vhold(n+1). These signals 203a, 203b, 203c are delayed by their respective signal delay elements 204a, 204b, 204c to produce the "present value" switch control signals Vsw1(n) 103ad, Vsw2(n) 103ae, Vhold(n) 103ab. Hold control signals Vhold(n) and Vhold(n+1) are further decoded by the other decoder stage 206 to produce the pre-charge Vpre(n) and discharge Vdis(n) cycle control signals 103aa, 103ac. In conformance with the discussion above concerning the generating of these pre-charge Vpre(n) and discharge Vdis (n) signals, the hold control signals Vhold(n), Vhold(n+1) are processed in accordance with the combination logic elements as shown. This processing is done in a bit-wise fashion. In other words, corresponding bits of the "present value" hold control signal Vhold(n) and "next value" hold control signal Vhold(n+1) are logically processed together to produce the corresponding respective bits of the pre-charge Vpre(n) and discharge Vdis(n) control signals.

Figure 6C:
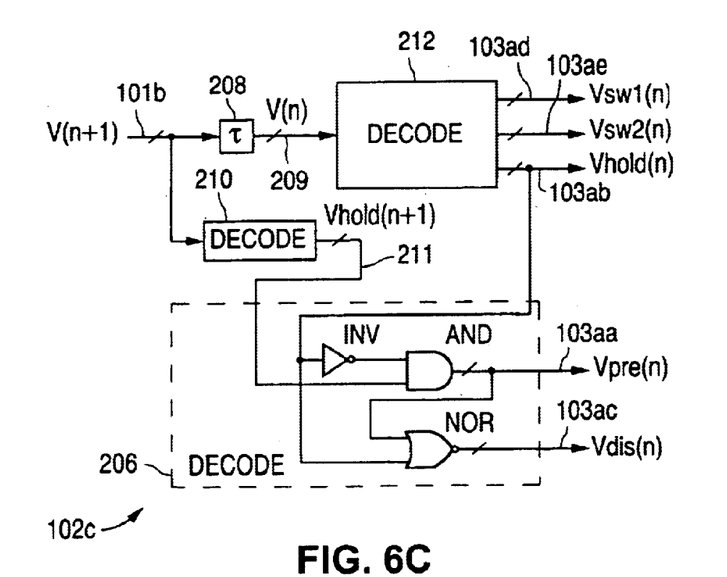

Referring to FIG. 6C, an alternative embodiment 102c of the controller 102 (FIG. 1) can be implemented using three decoder stages 206, 210, 212 and a signal delay element 208, interconnected substantially as shown. The incoming signal 101b is delayed by the delay element 208 to produce a set of interim control signals 209 (corresponding to the "present value" V(n) of the incoming signal 101b). These signals 209 are decoded by a decoder stage 212 to produce the current steering switch control signals Vsw1(n), Vsw2(n) and hold cycle controlled signal Vhold(n). Meanwhile, the incoming signal 101b is further decoded by another decoder stage 210 to produce another set of interim control signals 211 corresponding to the "next value" hold cycle control signals Vhold(n+1). Similar to the embodiment 102b of FIG. 6B, the third decoder stage 206 logically combines, in a bit-wise fashion, the respective bits of the "present value" Vhold(n) and "next value" Vhold(n+1) hold control signals 103ab, 211 to produce the pre-charge Vpre(n) and discharge Vdis(n) control signals 103aa, 103ac.

Figure 7A:
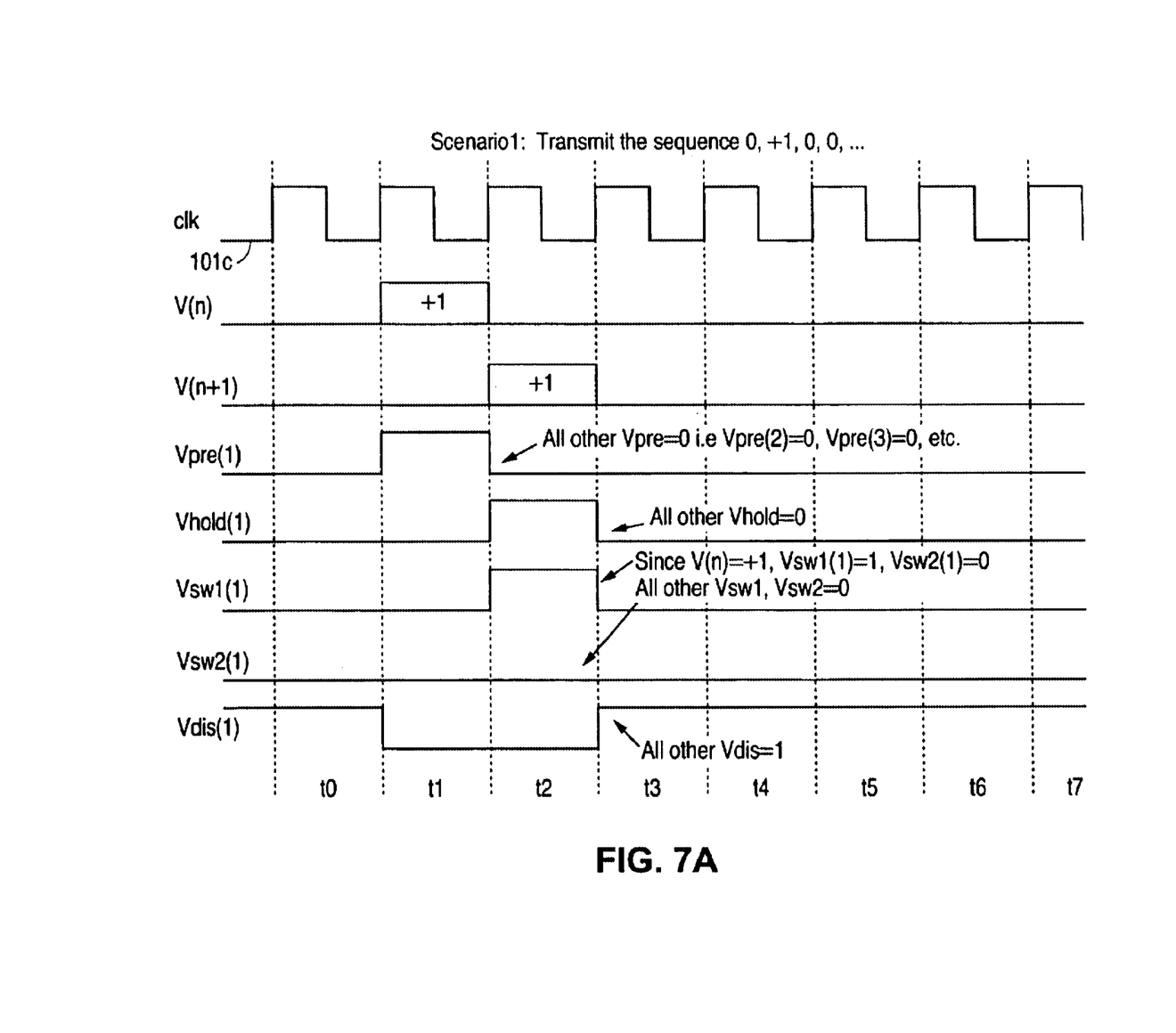
FIGS. 7A, 7B and 7C are signal timing diagrams indicating various examples of operation of the circuit of FIG. 1.

Referring to FIG. 7A, in conformance with the foregoing discussion, a signal timing diagram depicting the signal states during time intervals (i.e., clock cycles) t0–t7 for the "present value" V(n) and "next value" V(n+1) input signals and mode control signals Vpre(1), Vhold(1), Vsw1(1), Vsw2(1), Vdis(1), in relation to the clock signal 101c, would appear as shown. In this example, the circuit 100 of FIG. 1 is transmitting a signal to the load in which the first value is zero (interval t0), the second value is +1 (interval t1) and subsequent values are zero (intervals t2–t7). In this example, it can be seen that the current steering switch control signals Vsw1, Vsw2 are deasserted during time interval t1. As discussed above, these signals Vsw1, Vsw2 could also be asserted during time interval t1. In either situation, the resulting differential output signal during this time t1 is a common mode signal, thereby avoiding transmission of signal transients to the load.

Figure 7B:
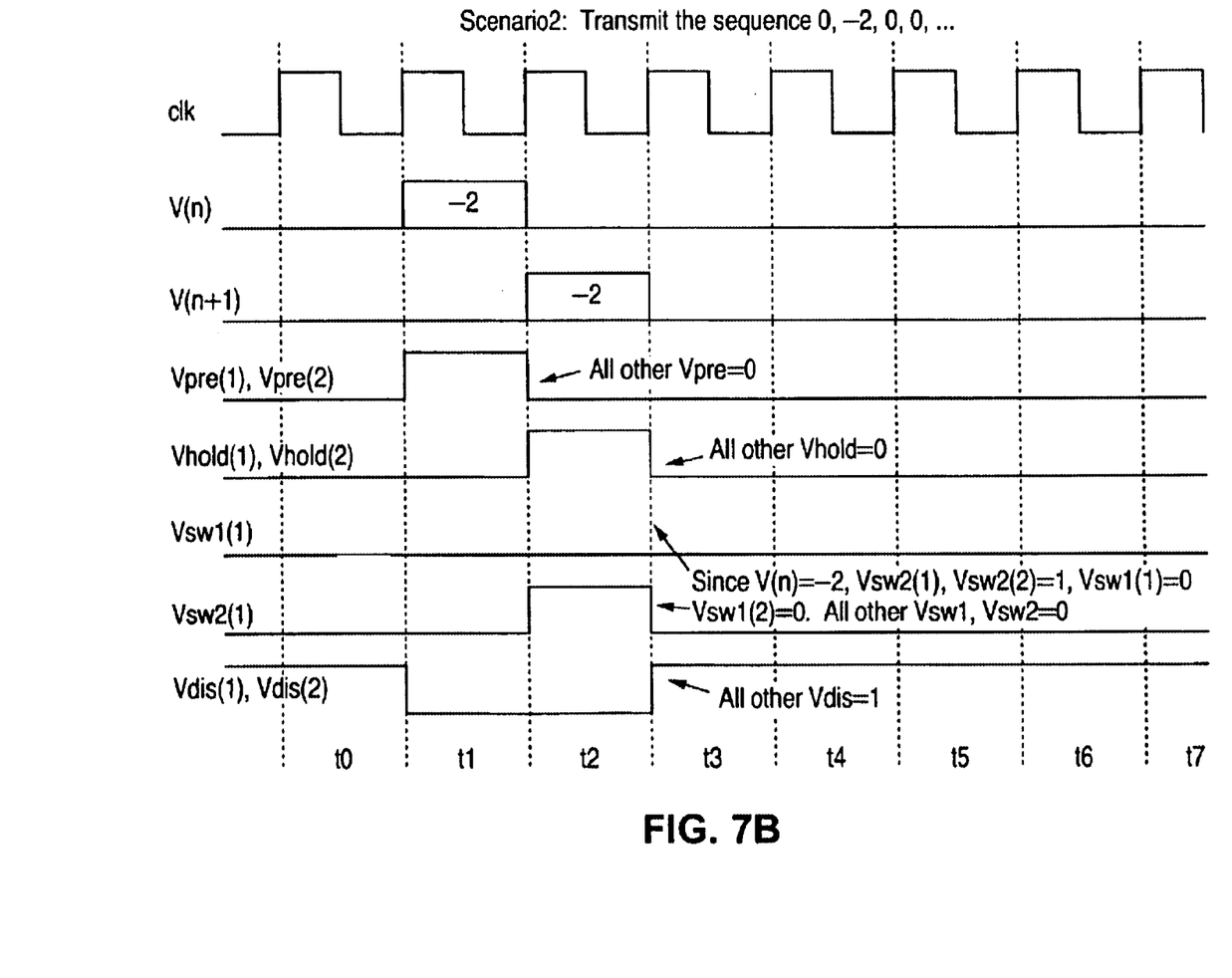

Referring to FIG. 7B, another example is provided in which the first value transmitted to the load is zero (interval t0), the second value transmitted is -2 (interval t1) and the remaining values are zero (intervals t2–t7). As before, during time interval t1, i.e., during the pre-charge cycle of operation, the current steering switch control signals Vsw1, Vsw2 can either be asserted or deasserted, provided that they are asserted or deasserted simultaneously so as to prevent transmission of signal transients to the load.

Figure 7C:
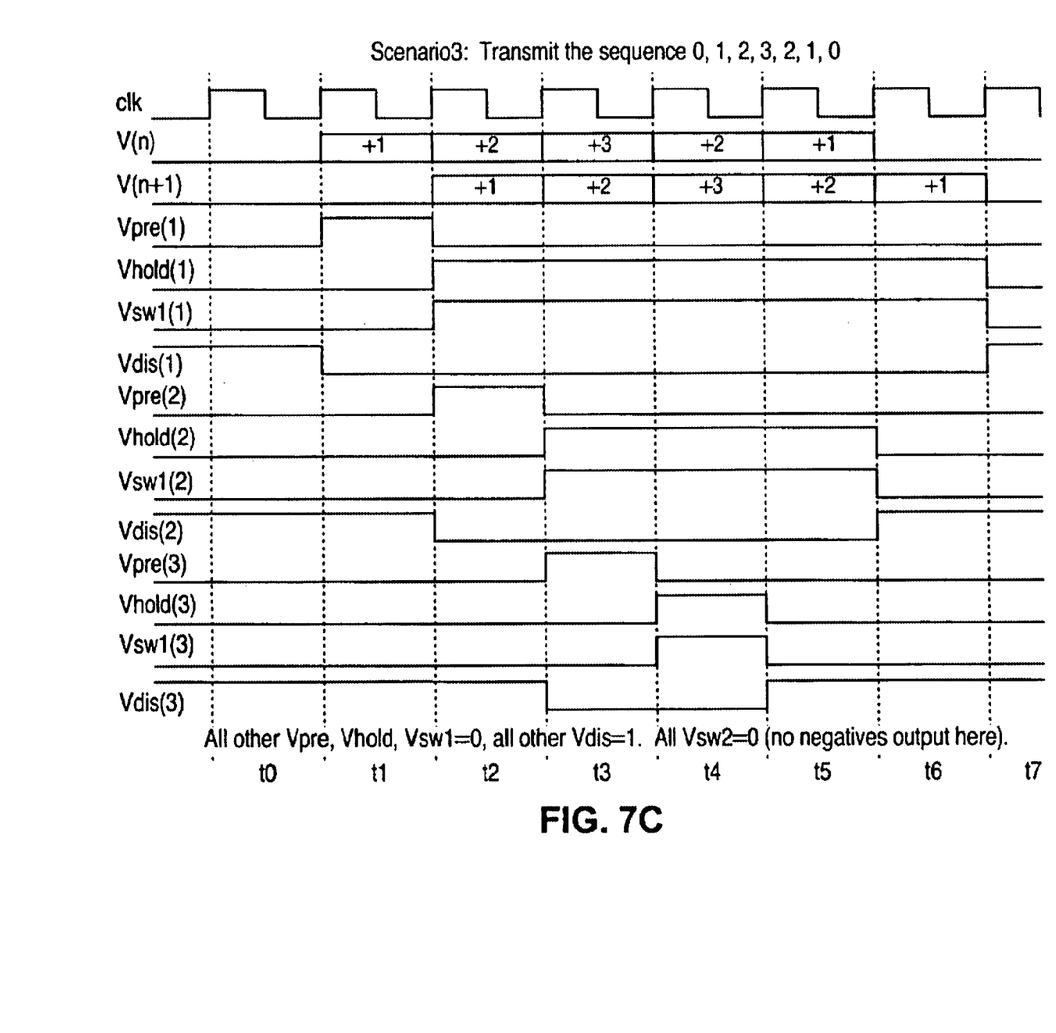

Referring to FIG. 7C, a more complex example is provided in which, following the transmission of an initial value of 0, subsequent values of +1, +2, +3, +2, +1 and 0 are transmitted during time intervals t1–t7, respectively. As before, the current steering switch control signals Vsw1, Vsw2 can be either asserted or deasserted during the pre-charge cycles, so long as they are asserted or deasserted simultaneously so as to prevent transmission of signal transients to the load.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a programmable differential current mode line driver with multiple classes of circuit operation, comprising:
   programmable differential current mode line driver circuitry that receives a plurality of mode control signals and in response thereto operates in one of a plurality of circuit operation modes and provides a differential current signal with one of a plurality of signal values; and
   control circuitry, coupled to said programmable differential current mode line driver circuitry, that receives a plurality of digital input signals and in response thereto provides said plurality of mode control signals, wherein
      in response to a first portion of said plurality of digital input signals, said one of a plurality of circuit operation modes comprises one of a plurality including a class A circuit operation mode and a class B circuit operation mode, and
      in response to a second portion of said plurality of digital input signals, said one of a plurality of signal values comprises one of a plurality including a plurality of positive signal values and a plurality of negative signal values.

2. The apparatus of claim 1, wherein:
   said programmable differential current mode line driver circuitry further receives a clock signal with a plurality of clock cycles; and
   said class B circuit operation mode includes a plurality of circuit operation cycles comprising
      a precharge cycle during a first portion of said plurality of clock cycles in which said differential current signal becomes a common mode current signal,
      a hold cycle during a second portion of said plurality of clock cycles in which said differential current signal becomes a differential current signal with said one of said plurality of signal values, and
      a discharge cycle during a third portion of said plurality of clock cycles in which said differential current signal becomes approximately zero.

3. The apparatus of claim 1, wherein said programmable differential current mode line driver circuitry includes a plurality of differential current mode line driver circuits each of which comprising:
   bias circuitry that receives a portion of said plurality of mode control signals and in response thereto provides first and second pluralities of bias signals;
   current source circuitry, coupled to said bias circuitry, that receives said first plurality of bias signals and in response thereto provides a source current; and
   current routing circuitry, coupled to said bias circuitry and said current source circuitry, that receives said source current and said second plurality of bias signals and in response thereto routes said source current to provide a portion of said differential current signal.

4. The apparatus of claim 1, wherein said programmable differential current mode line driver circuitry includes a plurality of differential current mode line driver circuits each of which comprising:
   a tail current source circuit that receives a first portion of said plurality of mode control signals and in response thereto provides a tail current; and
   a differential amplifier circuit, coupled to said tail current source circuit, that receives said tail current and a second portion of said plurality of mode control signals and in response thereto conducts said tail current to provide a portion of said differential current signal.

5. The apparatus of claim 4, wherein:
   said tail current source circuit comprises
      a first bias circuit that receives said first portion of said plurality of mode control signals and in response thereto provides one of a plurality of bias signals, and
      a current generator circuit, coupled to said first bias circuit, that receives said one of a plurality of bias signals and in response thereto provides said tail current; and
   said differential amplifier circuit comprises
      a second bias circuit that receives said second portion of said plurality of mode control signals and in response thereto provides first and second bias signals, and
      a current steering circuit, coupled to said second bias circuit, that receives said tail current and said first and second bias signals and in response thereto steers said tail current to provide said portion of said differential current signal.

6. The apparatus of claim 1, wherein said control circuitry comprises:
   decoding circuitry that receives and decodes said plurality of digital input signals and a first portion of said plurality of mode control signals and in response thereto provides a second portion of said plurality of mode control signals and a plurality of interim control signals; and
   signal delay circuitry, coupled to said decoding circuitry, that receives and delays said plurality of interim control signals and in response thereto provides said first portion and a third portion of said plurality of mode control signals.

7. The apparatus of claim 6, wherein said decoding circuitry comprises:
   a first decoder circuit that receives and decodes said plurality of digital input signals and in response thereto provides said plurality of interim control signals; and
   a second decoder circuit, coupled to said first decoder circuit and said signal delay circuitry, that receives and decodes said first portion of said plurality of mode control signals and a portion of said plurality of interim control signals and in response thereto provides said second portion of said plurality of mode control signals.

8. The apparatus of claim 7, wherein:
   said second decoder circuit comprises bit-wise decoding circuitry that decodes respective bits of said first portion of said plurality of mode control signals and said portion of said plurality of interim control signals; and
   respective ones of said first, second and third portions of said plurality of mode control signals correspond to each other and are provided to respective portions of said programmable differential current mode line driver circuitry.

9. The apparatus of claim 6, wherein said signal delay circuitry comprises a plurality of digital register circuits.

10. The apparatus of claim 1, wherein said control circuitry comprises:
   signal delay circuitry that receives and delays said plurality of digital input signals and in response thereto provides a first plurality of interim control signals; and
   decoding circuitry, coupled to said signal delay circuitry, that receives and decodes said plurality of digital input signals and said first plurality of interim control signals and in response thereto provides said plurality of mode control signals.

11. The apparatus of claim 10, wherein said signal delay circuitry comprises a plurality of digital register circuits.

12. The apparatus of claim 10, wherein said decoding circuitry comprises:
   a first decoder circuit that receives and decodes said plurality of digital input signals and in response thereto provides a second plurality of interim control signals;
   a second decoder circuit that receives and decodes said first plurality of interim control signals and in response thereto provides first and second portions of said plurality of mode control signals; and
   a third decoder circuit, coupled to said first and second decoder circuits, that receives and decodes said second plurality of interim control signals and said first portion of said plurality of mode control signals and in response thereto provides a third portion of said plurality of mode control signals.

13. The apparatus of claim 12, wherein:
   said third decoder circuit comprises bit-wise decoding circuitry that decodes respective bits of said second plurality of interim control signals and said first portion of said plurality of mode control signals; and
   respective ones of said first, second and third portions of said plurality of mode control signals correspond to each other and are provided to respective portions of said programmable differential current mode line driver circuitry.

14. The apparatus of claim 1, wherein said controller means comprises:
   delay means for delaying said plurality of digital input signals and in response thereto generating a first plurality of interim control signals; and
   decoder means for decoding said plurality of digital input signals and said first plurality of interim control signals and in response thereto generating said plurality of mode control signals.

15. An apparatus including a programmable differential current mode line driver with multiple classes of circuit operation, comprising:
   programmable differential current mode line driver means for receiving a plurality of mode control signals and in response thereto operating in one of a plurality of circuit operation modes and generating a differential current signal with one of a plurality of signal values; and
   controller means for receiving a plurality of digital input signals and in response thereto generating said plurality of mode control signals, wherein
      in response to a first portion of said plurality of digital input signals, said one of a plurality of circuit operation modes comprises one of a plurality including a class A circuit operation mode and a class B circuit operation mode, and
      in response to a second portion of said plurality of digital input signals, said one of a plurality of signal values comprises one of a plurality including a plurality of positive signal values and a plurality of negative signal values.

16. The apparatus of claim 15, wherein:
   said programmable differential current mode line driver means further receives a clock signal with a plurality of clock cycles; and
   said class B circuit operation mode includes a plurality of circuit operation cycles comprising
      a precharge cycle during a first portion of said plurality of clock cycles in which said differential current signal becomes a common mode current signal,
      a hold cycle during a second portion of said plurality of clock cycles in which said differential current signal becomes a differential current signal with said one of said plurality of signal values, and
      a discharge cycle during a third portion of said plurality of clock cycles in which said differential current signal becomes approximately zero.

17. The apparatus of claim 15, wherein said programmable differential current mode line driver means includes a plurality of differential current mode line driver means each of which comprising:
   biasing means for receiving a portion of said plurality of mode control signals and in response thereto generating first and second pluralities of bias signals;
   current sourcing means for generating a source current in response to said first plurality of bias signals; and
   current routing means for routing said source current as a portion of said differential current signal in response to said second plurality of bias signals.

18. The apparatus of claim 15, wherein said controller means comprises:
   decoder means for decoding said plurality of digital input signals and a first portion of said plurality of mode control signals and in response thereto generating a second portion of said plurality of mode control signals and a plurality of interim control signals; and
   delay means for delaying said plurality of interim control signals and in response thereto generating said first portion and a third portion of said plurality of mode control signals.

19. A method for generating a programmable differential current signal in accordance with multiple classes of circuit operation, comprising:
   receiving a plurality of mode control signals and in response thereto operating in one of a plurality of circuit operation modes and generating a differential current signal with one of a plurality of signal values; and
   receiving a plurality of digital input signals and in response thereto generating said plurality of mode control signals, wherein
      in response to a first portion of said plurality of digital input signals, said one of a plurality of circuit operation modes comprises one of a plurality including a class A circuit operation mode and a class B circuit operation mode, and
      in response to a second portion of said plurality of digital input signals, said one of a plurality of signal values comprises one of a plurality including a plurality of positive signal values and a plurality of negative signal values.

20. The method of claim 19, further comprising receiving a clock signal with a plurality of clock cycles, and wherein said receiving a plurality of mode control signals and in response thereto operating in a class B circuit operation mode and generating a differential current signal with one of a plurality of signal values comprises:

operating in a precharge cycle during a first portion of said plurality of clock cycles in which said differential current signal becomes a common mode current signal;

operating in a hold cycle during a second portion of said plurality of clock cycles in which said differential current signal becomes a differential current signal with said one of said plurality of signal values; and operating in a discharge cycle during a third portion of said plurality of clock cycles in which said differential current signal becomes approximately zero.

21. The method of claim 19, wherein said receiving a plurality of mode control signals and in response thereto operating in a class B circuit operation mode and generating a differential current signal with one of a plurality of signal values comprises:

operating in a precharge cycle during which a common mode current signal is generated;

operating in a hold cycle during which said common mode current signal generated in said precharge cycle becomes a differential signal with one of said plurality of signal values; and operating in a discharge cycle in which said differential signal generated in said hold cycle becomes another common mode current signal which becomes approximately zero.

* * * * *

UNITED STATES PATENT AND TRADEMARK OFFICE
CERTIFICATE OF CORRECTION

PATENT NO. : 6,762,625 B1
DATED : July 13, 2004
INVENTOR(S) : Varadarajan Devnath It is certified that error appears in the above-identified patent and that said Letters Patent is hereby corrected as shown below:

Column 5,
Line 31, please delete "A brupt" and replace with -- Abrupt --

Column 11,
Lines 41-49, should be deleted.
Line 51, delete "15." and replace with -- 14. --

Column 12,
Line 6, delete "16." and replace with -- 15. --
Line 6, delete "15" and replace with -- 14. --
Line 21, delete "17." and replace with -- 16. --
Line 21, delete "15" and replace with -- 14 --
Line 33, delete "18." and replace with -- 17. --
Line 33, delete "15" and replace with -- 14 --
Line 45, insert new paragraph
-- 18. The apparatus of claim 1, wherein said controller means comprises:
   delay means for delaying said plurality of digital input signals and in response thereto generating a first plurality of interim control signals; and
   decoder means for decoding said plurality of digital input signals and said first plurality of interim control signals and in response thereto generating said plurality of mode control signals. --

Signed and Sealed this

Twenty-first Day of December, 2004

JON W. DUDAS
*Director of the United States Patent and Trademark Office*